(12) United States Patent
Stilin

(10) Patent No.: US 11,466,576 B2
(45) Date of Patent: Oct. 11, 2022

(54) AIRFOIL WITH CONTINUOUS STIFFNESS JOINT

(71) Applicant: United Technologies Corporation, Farmington, CT (US)

(72) Inventor: Nicholas D. Stilin, Higganum, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 141 days.

(21) Appl. No.: 16/673,020

(22) Filed: Nov. 4, 2019

(65) Prior Publication Data
US 2021/0131294 A1    May 6, 2021

(51) Int. Cl.
*F01D 5/28* (2006.01)
*F01D 5/14* (2006.01)
*F01D 5/20* (2006.01)
*F04D 29/32* (2006.01)

(52) U.S. Cl.
CPC ............. *F01D 5/282* (2013.01); *F01D 5/147* (2013.01); *F01D 5/20* (2013.01); *F04D 29/324* (2013.01); *F05D 2240/303* (2013.01); *F05D 2240/307* (2013.01); *F05D 2300/10* (2013.01); *F05D 2300/603* (2013.01)

(58) Field of Classification Search
CPC ................................. F01D 5/147; F01D 5/282
See application file for complete search history.

(56) References Cited

U.S. PATENT DOCUMENTS

| 2,615,236 A | 10/1952 | Stulen et al. |
| 4,111,600 A | 9/1978 | Rothman et al. |
| 4,643,647 A | 2/1987 | Perry |

(Continued)

FOREIGN PATENT DOCUMENTS

| CA | 395673 | 4/1941 |
| EP | 0735161 | 10/1996 |

(Continued)

OTHER PUBLICATIONS

Translation of WO-2017109407-A1, Nov. 22, 2021.*

(Continued)

*Primary Examiner* — Woody A Lee, Jr.
*Assistant Examiner* — Cameron A Corday
(74) *Attorney, Agent, or Firm* — Carlson, Gaskey & Olds, P.C.

(57) ABSTRACT

An airfoil for a gas turbine engine according to an example of the present disclosure includes, among other things, an airfoil section extending between a leading edge and a trailing edge in a chordwise direction and extending between a tip portion and a root section in a spanwise direction. The airfoil section defines pressure and suction sides separated in a thickness direction. A sheath extends in the spanwise direction along at least one of the pressure and suction sides of the airfoil section. A tip cap extends in the chordwise direction along the at least one of the pressure and suction sides. The sheath includes a first set of interface members. The tip cap includes a second set of interface members interleaved with the first set of interface members to establish at least one joint along an external surface of the at least one of the pressure and suction sides. A method of assembly for an airfoil is also disclosed.

19 Claims, 6 Drawing Sheets

(56) References Cited

U.S. PATENT DOCUMENTS

| | | | |
|---|---|---|---|
| 5,129,787 A | 7/1992 | Violette et al. | |
| 5,791,879 A | 8/1998 | Fitzgerald et al. | |
| 5,839,882 A | 11/1998 | Finn et al. | |
| 5,908,285 A | 6/1999 | Graff | |
| 5,908,522 A | 6/1999 | Lofstrom et al. | |
| 6,039,542 A | 3/2000 | Schilling et al. | |
| 6,524,063 B1 * | 2/2003 | Beyer | F03B 3/125 415/115 |
| 6,872,340 B2 | 3/2005 | Cundiff et al. | |
| 7,575,417 B2 | 8/2009 | Finn et al. | |
| 7,828,526 B2 | 11/2010 | Cairo et al. | |
| 7,980,817 B2 | 7/2011 | Foose et al. | |
| 8,241,003 B2 | 8/2012 | Roberge | |
| 8,348,622 B2 | 1/2013 | Bech | |
| 9,121,294 B2 | 9/2015 | Kray et al. | |
| 9,598,966 B2 | 3/2017 | Klein et al. | |
| 9,765,634 B2 | 9/2017 | Fameau et al. | |
| 10,030,522 B2 | 7/2018 | Benson | |
| 10,174,625 B2 | 1/2019 | Benson | |
| 10,677,259 B2 | 6/2020 | Jain et al. | |
| 2005/0180854 A1 | 8/2005 | Grabau et al. | |
| 2008/0181766 A1 | 7/2008 | Campbell et al. | |
| 2010/0322760 A1 * | 12/2010 | Morrison | F01D 5/284 415/200 |
| 2011/0033308 A1 | 2/2011 | Huth et al. | |
| 2011/0116906 A1 | 5/2011 | Smith et al. | |
| 2011/0182740 A1 | 7/2011 | Klinetob et al. | |
| 2011/0194941 A1 * | 8/2011 | Parkin | F04D 29/023 416/224 |
| 2012/0301292 A1 | 11/2012 | Deal et al. | |
| 2013/0008027 A1 | 1/2013 | Franchet et al. | |
| 2013/0039774 A1 | 2/2013 | Viens et al. | |
| 2013/0064676 A1 | 3/2013 | Salisbury et al. | |
| 2013/0167555 A1 | 7/2013 | Schwarz et al. | |
| 2013/0239586 A1 | 9/2013 | Parkin et al. | |
| 2017/0268349 A1 | 9/2017 | Bryant, Jr. et al. | |

FOREIGN PATENT DOCUMENTS

| | | | |
|---|---|---|---|
| EP | 1481747 | 12/2004 | |
| EP | 1939401 | 7/2008 | |
| EP | 2253806 | 11/2010 | |
| EP | 2362066 | 8/2011 | |
| EP | 2458153 | 5/2012 | |
| EP | 2607628 | 6/2013 | |
| EP | 2693061 | 2/2014 | |
| EP | 2772615 | 9/2014 | |
| EP | 3196427 | 7/2017 | |
| EP | 3222815 | 9/2017 | |
| EP | 3282090 | 2/2018 | |
| WO | WO-2017109407 A1 * | 6/2017 | F04D 29/023 |

OTHER PUBLICATIONS

International Search Report and Written Opinion for PCT Application No. PCT/US2014/050614 completed Nov. 19, 2014.

Extended European Search Report for European Patent Application No. 14842050.8 completed May 9, 2017.

International Preliminary Report on Patentability for PCT Application No. PCT/US2014/050614 completed Mar. 15, 2016.

European Search Report for European Patent Application No. 20204160.4 completed Jan. 29, 2021.

European Search Report for European Patent Application No. 20205011.8 completed Jan. 21, 2021.

* cited by examiner

AIRFOIL WITH CONTINUOUS STIFFNESS JOINT

BACKGROUND

This disclosure relates to a gas turbine engine, and more particularly to an airfoil having a sheath.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The fan can include an array of fan blades each having a main body that establishes an aerodynamic surface contour. The main body may be formed from a composite material made of a layup of one or more laminated layers. One or more sheaths may be secured to the main body to reduce a likelihood delamination of the layup due to a bird strike or other foreign object debris (FOD) event.

SUMMARY

An airfoil for a gas turbine engine according to an example of the present disclosure includes an airfoil section extending between a leading edge and a trailing edge in a chordwise direction and extending between a tip portion and a root section in a spanwise direction. The airfoil section defines pressure and suction sides separated in a thickness direction. A sheath extends in the spanwise direction along at least one of the pressure and suction sides of the airfoil section. A tip cap extends in the chordwise direction along the at least one of the pressure and suction sides. The sheath includes a first set of interface members. The tip cap includes a second set of interface members interleaved with the first set of interface members to establish at least one joint along an external surface of the at least one of the pressure and suction sides.

In a further embodiment of any of the foregoing embodiments, the sheath extends along the leading edge, and the at least one joint is dimensioned to extend along the tip portion.

In a further embodiment of any of the foregoing embodiments, the airfoil section comprises a composite material.

In a further embodiment of any of the foregoing embodiments, the sheath and tip cap are metallic.

In a further embodiment of any of the foregoing embodiments, terminal ends of the first set of interface members are received in respective recesses between adjacent pairs of the second set of interface members such that the first set of interface members are at least partially aligned with the second set of interface members relative to the chordwise direction.

In a further embodiment of any of the foregoing embodiments, the sheath includes a sheath body extending from the tip portion along the leading edge, and the first set of interface members extend outwardly from the sheath body. The tip cap includes a first cap portion and a second cap portion extending transversely from the first cap portion. The first cap portion extends along the tip portion. The second set of interface members extend outwardly from the first cap portion, and the second cap portion extends in the spanwise direction along the trailing edge.

In a further embodiment of any of the foregoing embodiments, the sheath defines a sheath cavity dimensioned to receive a portion of the airfoil body such that the sheath extends in the spanwise direction along both of the pressure and suction sides. The tip cap defines a cap cavity dimensioned to receive another portion of the airfoil body such that the tip cap extends in the chordwise direction along both of the pressure and suction sides.

In a further embodiment of any of the foregoing embodiments, the at least one joint includes a first joint along the pressure side and a second joint along the suction side.

In a further embodiment of any of the foregoing embodiments, the first joint is staggered from the second joint relative to the chordwise direction.

In a further embodiment of any of the foregoing embodiments, the airfoil is a fan blade.

A gas turbine engine according to an example of the present disclosure includes a fan section including a fan having a fan hub carrying a plurality of fan blades, a turbine section including a fan drive turbine rotatably coupled to the fan, and a compressor section driven by the turbine section. Each fan blade of the plurality of fan blades includes an airfoil section extending from a root section, a sheath extending along a leading edge of the airfoil section, and a tip cap extending along a tip portion of the airfoil section. The sheath includes a first interface portion. The tip cap includes a second interface portion cooperating with the first interface portion to establish at least one joint having a circuitous profile along an external surface of the airfoil section.

In a further embodiment of any of the foregoing embodiments, the first interface portion includes a first set of interface members extending outwardly from a sheath body. The second interface portion includes a second set of interface members extending outwardly from a cap body and interleaved with the first set of interface members to establish the at least one joint.

In a further embodiment of any of the foregoing embodiments, the at least one joint is dimensioned to extend along the tip portion.

In a further embodiment of any of the foregoing embodiments, the airfoil section includes an airfoil body comprising a composite layup that establishes the tip portion.

In a further embodiment of any of the foregoing embodiments, the sheath and the tip cap are metallic.

In a further embodiment of any of the foregoing embodiments, the at least one joint includes a first joint and a second joint on opposed sides of the airfoil section.

In a further embodiment of any of the foregoing embodiments, the airfoil section extends in a chordwise direction between the leading edge and a trailing edge, and the first joint is staggered from the second joint relative to the chordwise direction.

A method of assembly for airfoil according to an example of the present disclosure includes securing a sheath to a leading edge of an airfoil section, the sheath having a first set of interface members, and securing a tip cap to a tip portion of the airfoil section such that a second set of interface members of the tip cap are interleaved with the first set of interface members to establish at least one joint along an external surface of the airfoil section.

In a further embodiment of any of the foregoing embodiments, the first and second sets of interface members establish a continuous surface with at least one of a pressure side and a suction side of the airfoil section.

In a further embodiment of any of the foregoing embodiments, the sheath includes a sheath cavity. The tip cap includes a cap cavity. The step of securing the sheath includes inserting a portion of the airfoil section of the airfoil section into the sheath cavity, and the step of securing the tip cap includes inserting another portion of the airfoil section into the cap cavity such that the first and second sets of interface members cooperate to bound the sheath and tip cavities adjacent to the at least one joint.

The various features and advantages of this disclosure will become apparent to those skilled in the art from the following detailed description. The drawings that accompany the detailed description can be briefly described as follows.

DETAILED DESCRIPTION

Figure 1:
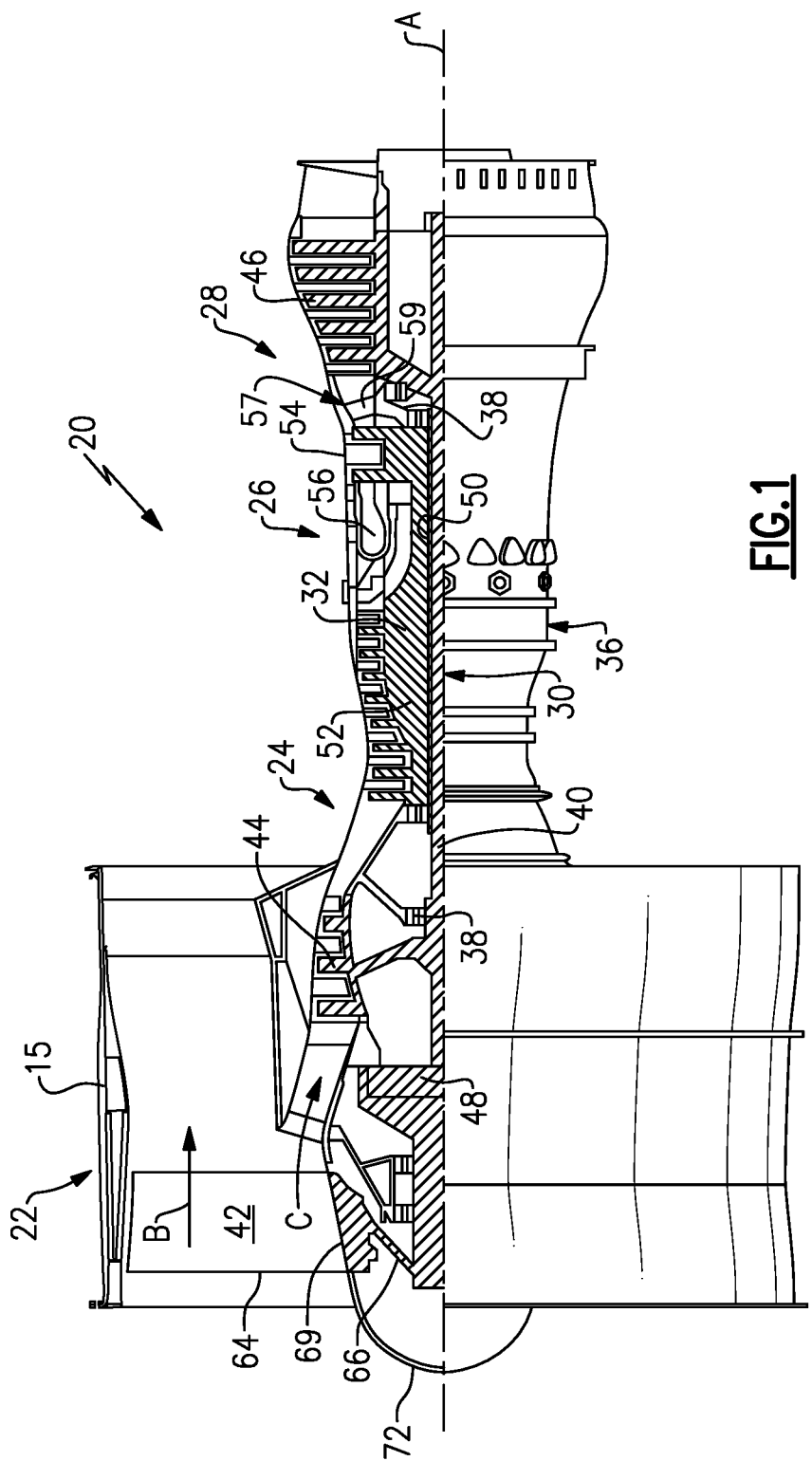
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
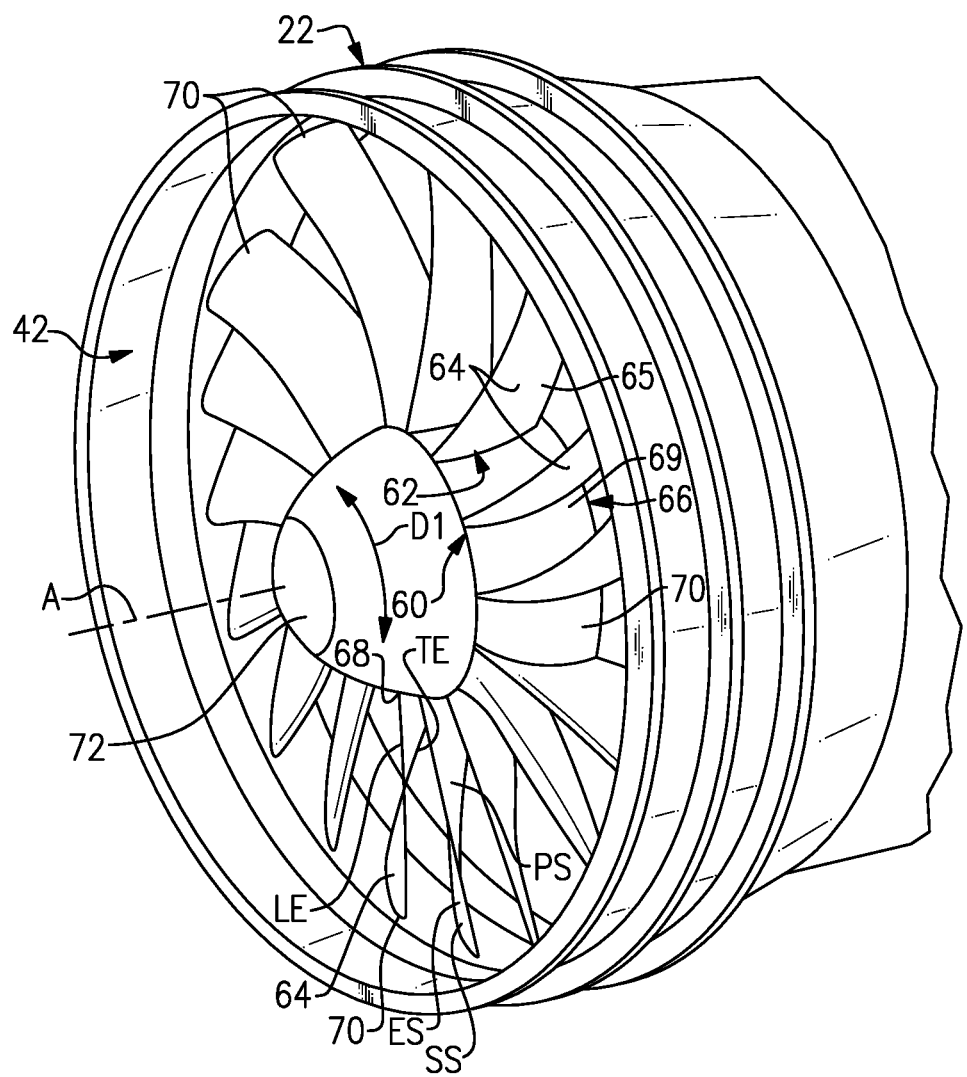
FIG. 2 illustrates a perspective view of a fan section including an array of airfoils.

Referring to FIG. 2, the fan 42 includes a rotor 60 including a fan hub 66 carrying or otherwise supporting a plurality of airfoils or fan blades 64. The fan blades 64 are arranged in an array or row 62 and are circumferentially distributed about the hub 66 (see also FIG. 1). Various numbers of fan blades 64 may be incorporated into the fan 42, such as a total quantity of between 12 and 20 of fan blades 64. The array 62 of fan blades 64 are circumferentially distributed about the engine axis A. The low pressure turbine 46 can be rotatably coupled to the hub 66 of the fan 42. The fan blades 64 are rotatable in a direction D1 about the engine axis A in response to rotation of the hub 66.

The airfoil 64 extends radially outward of a platform 69, which provides the inner flow path. The platform 69 may be integral with the airfoil 64 or separately secured to the hub 66, for example. A nosecone or spinner 72 is supported relative to the hub 66 to provide an aerodynamic inner flow path into the fan section 22, as illustrated in FIGS. 1-2.

Figure 3:
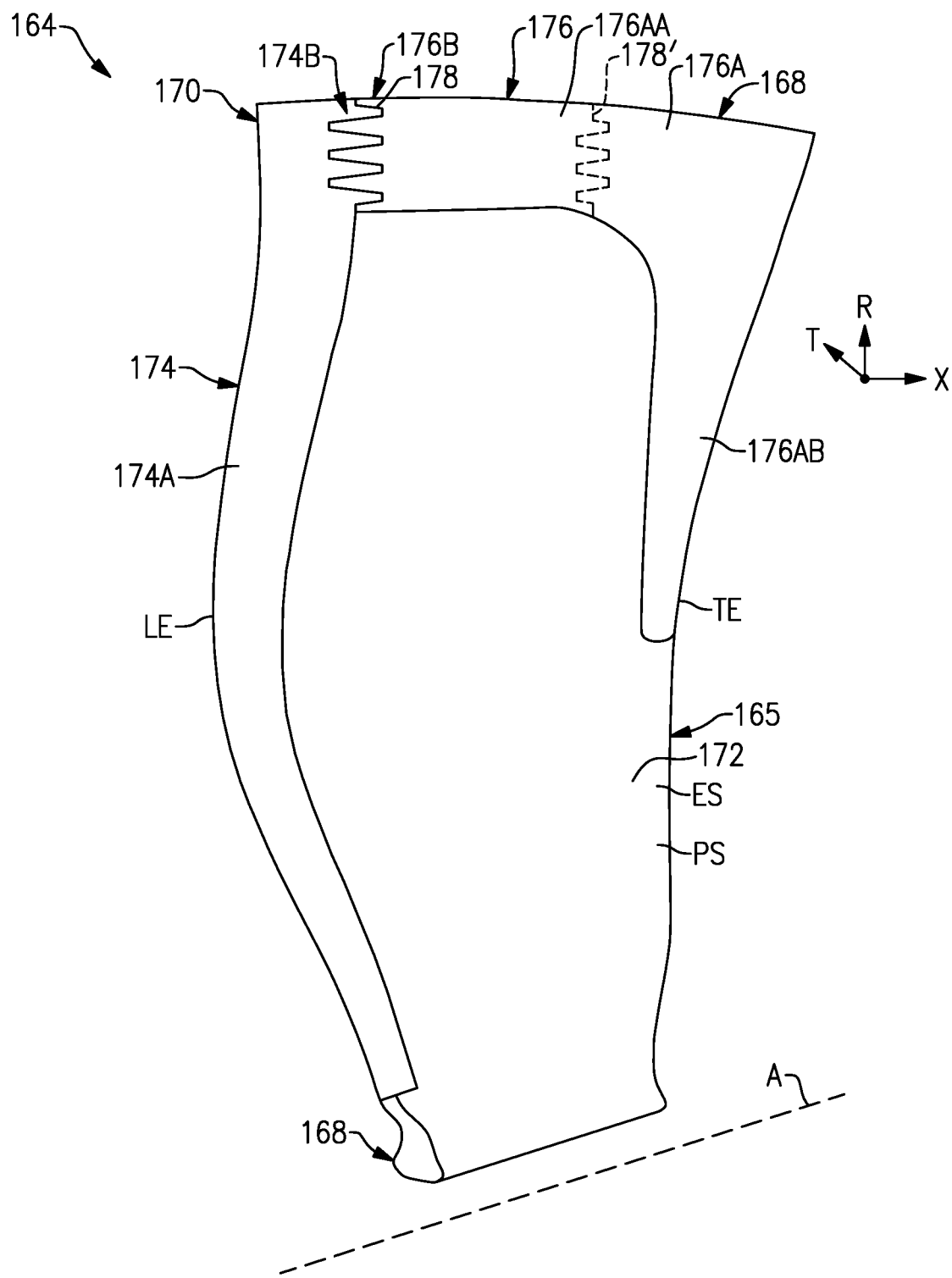
FIG. 3 illustrates a perspective view of an airfoil including a sheath and tip cap.

FIG. 3 illustrates an exemplary airfoil 164 for a gas turbine engine. In this disclosure, like reference numerals designate like elements where appropriate and reference numerals with the addition of one-hundred or multiples thereof designate modified elements that are understood to incorporate the same features and benefits of the corresponding original elements. The airfoil 164 can be a fan blade incorporated into the fan 42 of FIGS. 1-2, for example. It should be understood that other types of airfoils and other parts of the gas turbine engine 20 may benefit from the examples disclosed herein, such as inlet and exit guide vanes and other airfoils in the fan section 22, compressor section 24 and/or turbine section 28.

Referring to FIG. 3, with continuing reference to FIG. 2, the airfoil 164 includes an airfoil section 165 and a root section 168. The root section 168 is received in a correspondingly shaped slot in the hub 66. The root section 168 can have a shape configured to mount the airfoil 164 to the hub 66, such as a dovetail shape.

Figure 5:
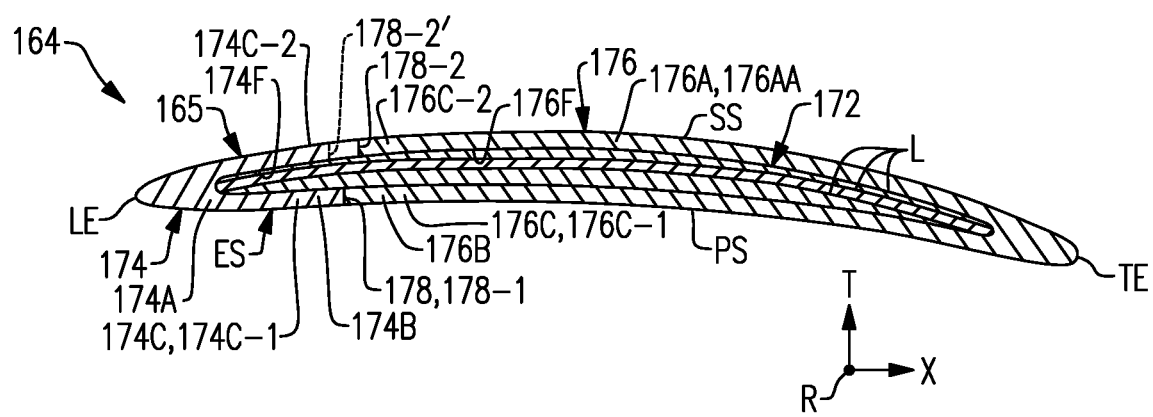
FIG. 5 illustrates a sectional view of the airfoil taken along line 5-5 of FIG. 4.

The airfoil section 165 extends in a radial or spanwise direction R between the root section 168 and a tip portion 170, in a chordwise direction X between a leading edge LE and a trailing edge TE, and in a thickness direction T between a pressure side PS and a suction side SS (FIGS. 2 and 5). The tip portion 170 establishes a terminal end of the airfoil 164.

The airfoil section 165 of each airfoil 164 has an exterior surface ES providing an aerodynamic surface contour that extends in the chordwise direction X between the leading and trailing edges LE, TE. The exterior surface ES of the airfoil 164 generates lift based upon its geometry and directs flow along the core flow path C and bypass flow path B. The airfoil 164 may be constructed from a composite material, stainless steel, an aluminum or titanium alloy, or a combination of one or more of these. Abrasion-resistant coatings or other protective coatings may be applied to the airfoil 164.

Various materials can be utilized to construct the airfoil body 172 of the airfoil section 165 and the root section 168, such as metallic materials including titanium, aluminum, alloys, and composite materials. In some examples, the airfoil body 172 is constructed from a composite layup that establishes the tip portion 170. The composite layup can include a plurality of plies or layers L (FIG. 5) of composite material. Example composite materials include carbon fibers embedded in a polymer matrix material. Other example composite materials include fiberglass, aramid fibers such as Kevlar®, and polyethylene. The layers L can be made of various constructions such as braided or woven fibers, fabrics, and/or uni-tape plies, for example.

The airfoil 164 includes a (first) sheath 174 and a tip cap (or second sheath) 176 secured to the airfoil body 172. The sheath 174 and tip cap 176 are dimensioned to extend along the external surface ES of the airfoil body 172 at various positions and serve to protect the airfoil body 172 from impacts that may occur during engine operation such as bird strikes and other foreign object debris (FOD).

The sheath 174 and tip cap 176 can be arranged at various positions and orientations relative to the airfoil body 172. In the illustrative example of FIGS. 3-5, the sheath 174 has a major component dimensioned to extend along a periphery of the leading edge LE of the airfoil section 165. The sheath 174 includes a sheath body 174A that extends in the spanwise direction R along both (or at least one) of the pressure and suction sides PS, SS. The sheath body 174A is dimensioned to extend from the tip portion 170 along the leading edge LE towards the root section 168. The sheath body 174A can be dimensioned to extend at least a majority of span positions of the airfoil section 165. In the illustrative example of FIG. 3, the sheath body 174A extends between approximately 0% span and approximately 100% span. For the purposes of this disclosure, 0% span is defined at a junction between the airfoil section 165 and the root section 164, and 100% span is defined at a radially outermost position or terminal end of the tip portion 170. For the purposes of this disclosure, the terms "about" and "approximately" mean±3% of the stated value unless otherwise disclosed.

Figure 4:
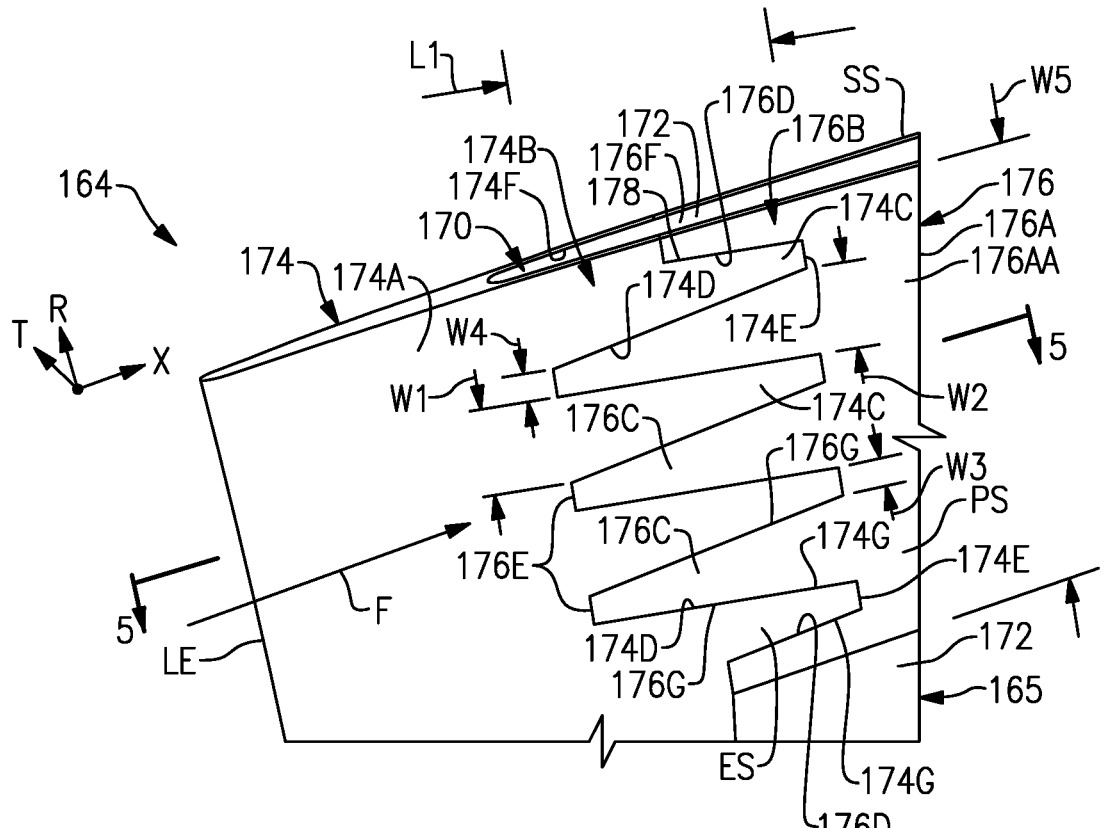
FIG. 4 illustrates a joint established between the sheath and tip cap of FIG. 3.

The tip cap 176 includes a cap body 176A dimensioned to extend along a periphery of the tip portion 170 and/or along a periphery of the trailing edge TE of the airfoil section 165, as illustrated in FIGS. 3-4. The tip cap 176 is dimensioned to extend in a chordwise direction X along both (or at least one) of the pressure and suction sides PS, SS. The cap body 176A includes a first cap portion 176AA and a second cap portion 176AB extending transversely from the first cap portion 176AA. The first cap portion 176AA has a major component dimensioned to extend in the chordwise direction X along the tip portion 170. The airfoil body 172 can be at least partially exposed along the terminal end of the airfoil section 165, as illustrated in FIG. 4. In other examples, the sheath 174 and/or tip cap 176 enclose the airfoil body 172 along the terminal end of the airfoil section 165. The second cap portion 176AB has a major component dimensioned to extend in the spanwise direction R along the trailing edge TE. In other examples, the second cap portion 176AB is omitted.

The cap body 176A including the second cap portion 176AB can be dimensioned to extend along various span positions of the airfoil section 165. The cap body 176A including the second cap portion 176AB can extend at least a majority of span positions along the trailing edge TE of the airfoil section 165. In the illustrative example of FIG. 3, the cap body 176A including the second cap portion 176AB extends inwardly from 100% span towards the root section 168, such as at least 50% or 75% span. The cap body 176A can be spaced apart from the root section 168, as illustrated in FIG. 3. Other arrangements can be utilized. For example, the tip cap 176 can extend along the leading edge LE and tip portion 170, and the sheath 174 can extend from the tip portion 170 along the trailing edge TE.

The sheath 174 and tip cap 176 mate or otherwise cooperate to establish at least one joint 178 along the external surface ES of the airfoil section 165. Utilizing the techniques disclosed herein, each joint 178 provides substantially continuous stiffness along adjacent portions of the airfoil body 172. The joint 178 can be dimensioned to extend along the tip portion 170, such as inwardly from the terminal end of the airfoil section 165 adjacent the leading edge LE region, as illustrated in FIGS. 3-4. In other examples, the joint 178 is spaced apart from the terminal end of the tip portion 170. In another example, joint 178' (shown in dashed lines in FIG. 3 for illustrative purposes) is established relatively closer to the trailing edge TE such as at approximately midchord. The sheath 174 and tip cap 176 can directly abut each other along the joint 178 or can define a relatively small gap to accommodate manufacturing tolerances. Adhesive or another bonding material can substantially fill a volume of the gap to establish a substantially continuous surface contour.

Figure 6:
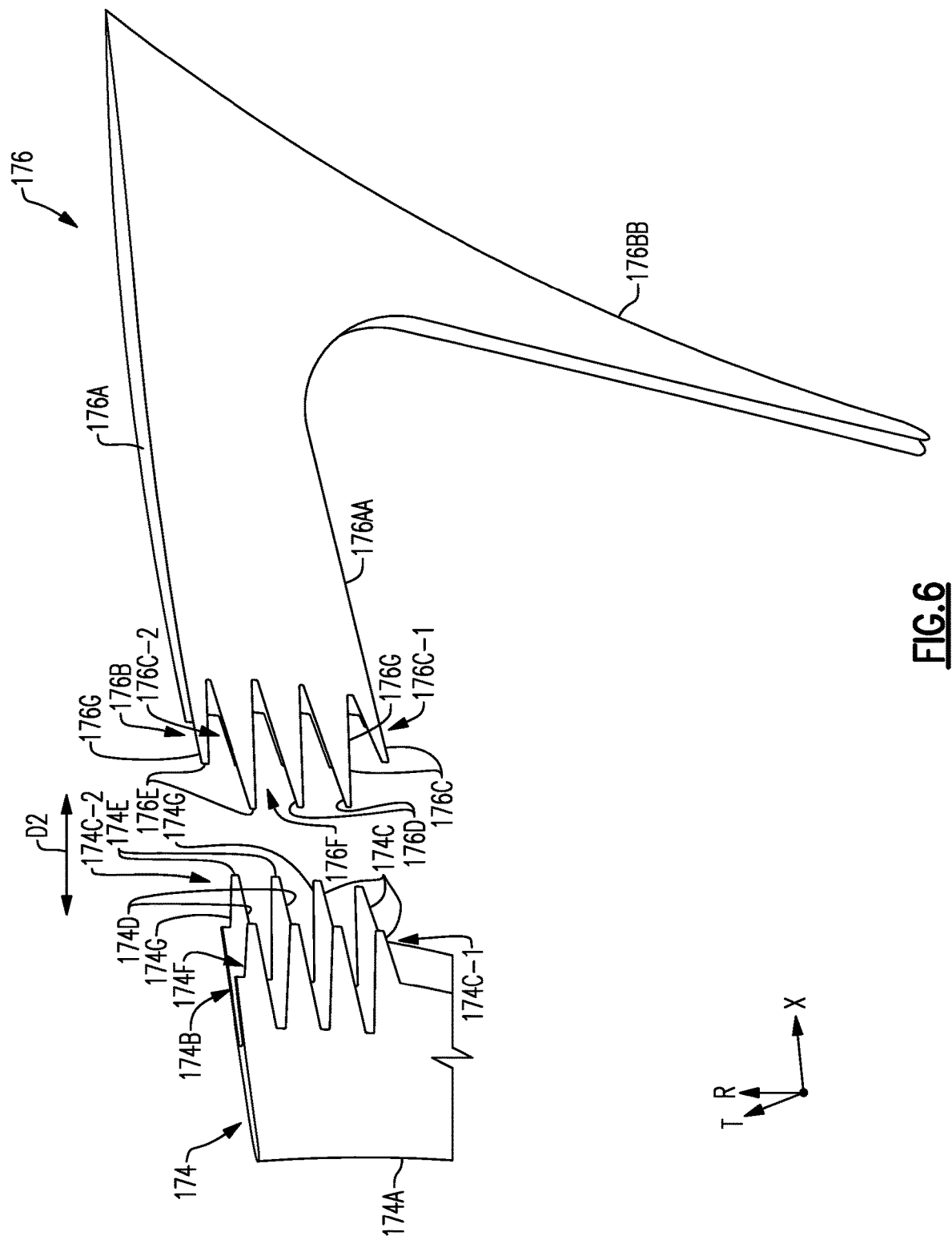
FIG. 6 illustrates an exploded view of the sheath and tip cap of FIG. 3.

Referring to FIGS. 4-6, with continuing reference to FIG. 3, the sheath 174 includes a first interface portion 174B extending outwardly from the sheath body 174A. The tip cap 176 includes a second interface portion 176B extending outwardly from the first cap portion 176AA of the cap body 176A. The first interface portion 174B cooperates with the second interface portion 176B to establish one or more joints 178, as illustrated in FIGS. 4 and 6. The interface portions 174B, 176B provide a structural connection between the sheath 174 and tip cap 176. In the illustrative example of FIG. 4, the joint 178 is established along the external surface ES of at least one of the pressure and suction sides PS, SS (e.g., pressure side PS).

The first and second interface portions 174B, 176B can be dimensioned to establish at least one joint 178 having a circuitous profile along the external surface ES of the airfoil section 165, as illustrated by the joint 178 of FIG. 4. For the purposes of this disclosure, the term "circuitous" means a profile having two or more points of inflection. The circuitous profile can reduce structural stiffness discontinuities that may otherwise degrade a structural integrity of the airfoil 164 that may otherwise occur to FOD impacts. The first interface portion 174B includes a first set of interface members (or fingers) 174C extending outwardly from the sheath body 174A. The second interface portion 176B includes a second set of interface members (or fingers) 176C extending outwardly from the first cap portion 176AA of the cap body 176A. The interface members 174C, 176C can be dimensioned to extend at various orientations relative to the airfoil body 172. In the illustrative example of FIG. 4, the interface members 174C, 176C have a major component that extends in the chordwise direction X. Various quantities of interface members 174C, 176C can be utilized. In the illustrative example of FIG. 4, the interface portion 174B has a quantity of three interface members 174C, and the interface portion 176B has a quantity of three interface members 176C. However, fewer or more than three interface members 174C and three interface members 176C can be utilized.

The first set of interface members 174C and the second set of interface members 176C can have complementary, interlocking profiles and are interleaved with each other to establish the respective joint(s) 178. In the illustrative example of FIGS. 4 and 6, each interface member 174C is an elongated finger or protrusion dimensioned to extend outwardly from a base along the sheath body 174A to a respective terminal end 174E, and each interface member 176C is an elongated finger or protrusion dimensioned to extend outwardly from a base along the first cap portion 176AA of the cap body 176A to the respective terminal end 176E. Sidewalls 174G, 176G of the respective interface members 174C, 176C can have a flat or substantially linear geometry, and can taper inwardly from the base to the respective terminal end 174E, 176E, as illustrated in FIGS. 4 and 6. The tapering geometry of the interface members 174C, 176C can serve to increase an effective length of the respective joint 178.

The terminal ends 174E, 176E of the respective interface members 174C, 176C can have various geometries. In the illustrated example of FIG. 4, the terminal ends 174E, 176E have substantially flat or linear geometry, which can serve to increase an effective length of the respective joint 178. Interleaving the interface members 174C, 176C according to the techniques disclosed herein serves to provide a stiffness continuous transition between the interface members 174C, 176C and establishes a substantially continuous stiffness joint 178, which can serve to oppose out-of-plane bending loads, improve load transfers and reduce a likelihood of localized, inter-laminar stress concentrations and delamination of the composite plies or layers L (FIG. 5) that may otherwise occur due to FOD impacts. Interleaving the interface members 174C, 176C can also occur without an increased weight as compared to a linear butt joint.

The interface members 174C, 176C can be dimensioned to establish a predefined stiffness adjacent to the joint 178. In the illustrative example of FIG. 4, each interface members 174C, 176C extends a length L1 between the respective base and terminal end 174E, 176E. Each base of the interface member 174C/176C extends a first width W1/W2, and each terminal end 174E, 176E of the interface member 174C/176C extends a second width W3/W4. Widths W1 and W2 can be the same or can differ, and widths W3 and W4 can be the same or can differ. In examples, a ratio of W1:W3 (or W2:W4) is greater than or equal to about 2:1 or 3:1 for at least some, a majority, or all of the interface members 174C, 176C. In examples, a ratio of L1:W1 (or L1:W2) is greater than or equal to about 2:1 or 3:1 for at least some, a majority, or all of the interface members 174C, 176C. Dimensioning the interface members 174C, 176C utilizing the dimensions disclosed herein can increase an effective length of the joint 178, which can increase an axial overlap between the interface members 174C, 176C and improve strength along the joint 178 and stiffness of the airfoil 164 along adjacent portions of the airfoil body 172.

Figure 7:
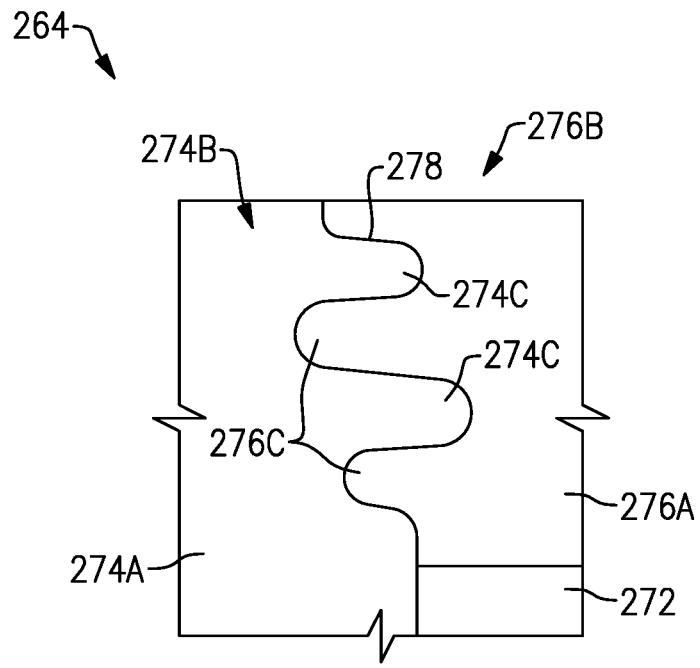
FIG. 7 illustrates a joint according to another example.
Figure 8:
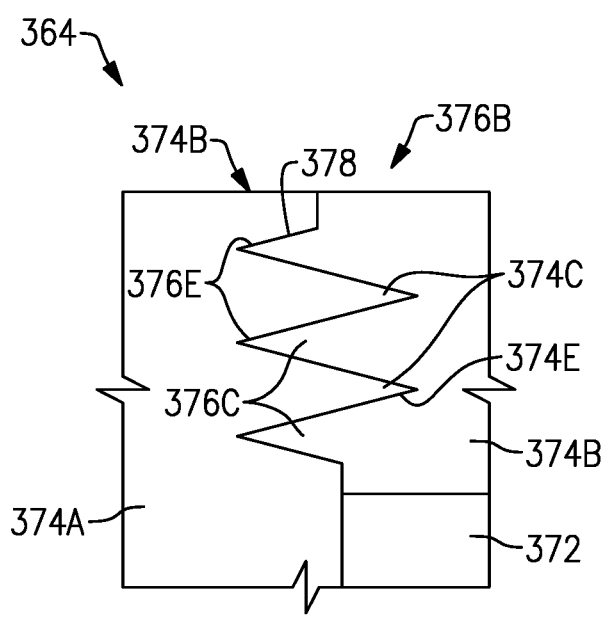
FIG. 8 illustrates a joint according to yet another example.

The interface members can have other geometries or profiles. In the illustrative example of FIG. 7, interface members 274C, 276C are dimensioned such that joint 278 has a generally serpentine geometry or profile. At least some of the interface members 274C, 276C have different lengths. In the illustrative example of FIG. 8, joint 378 has a generally zigzagging geometry or profile. Interface members 374C, 376C have a substantially triangular geometry with terminal ends 374E, 376E substantially tapering to a point.

The first set of interface members 174C and the second set of interface members 176C are interleaved with each other to establish the respective joint(s) 178. The interface portions 174B, 176B define one or more respective recesses 174D, 176D between adjacent pairs of the interface members 174C, 176C. The terminal ends 174E of the interface members 174C interfit with or are otherwise received in the respective recesses 176D established between the interface members 176C. Likewise, the terminal ends 176E of the interface members 176C interfit with or are otherwise received in the respective recesses 174D established between adjacent pairs of the interface members 174C. The terminal ends 174E, 176E are received in the respective recesses 174D, 176D such that the interface members 174C are at least partially aligned with the interface members 176C relative to the chordwise direction X, as illustrated in FIG. 4, for example. The terminal ends 174E, 176E can be dimensioned to reduce aerodynamic discontinuities along the external surface ES of the airfoil section 165 across the joint 178. In the illustrative example of FIG. 4, a major component of the sidewalls 174G, 176G of the respective interface members 174C, 176C can be dimensioned to extend parallel to a general direction of flow F across the airfoil 164, and a major component of the terminal ends 174E, 176E may extend substantially normal to the general direction of flow F. A ratio of a total of the widths W3, W4 of the terminal ends 174E, 176E and a total width W5 of the respective joint 178 is less than or equal to 3:4, or more narrowly less than or equal to 1:2. Aerodynamic discontinuities along the external surface ES of the airfoil section 165 can be minimized or otherwise reduced by reducing the widths W3 and/or W4 with respect to a general direction of flow of flow F. The interface members 174C can be substantially flush with the interface members 176C along the respective joint 178, which can reduce aerodynamic discontinuities along the external surface ES of the airfoil section 165.

In the illustrative example of FIG. 5, the interface portions 174B, 176B cooperate to establish first and second joints 178-1, 178-2 along the external surface ES on opposed sides of the airfoil section 165. In the illustrative example of FIGS. 5-6, the interface members 174C, 176C are arranged in two rows extending outwardly from opposed sides of the sheath body 174A and cap body 176A (indicated at 174C-1/174C-2 and 176C-1/176C-2). The opposed rows 174C-1/174C-2 of interface members 174C are arranged to bound the recess 174D. The opposed rows 176C-1/176C-2 of interface members 176C are arranged to bound the recess 176D. The rows 174C-1/176C-1 are arranged to establish the first joint 178-1 along the external surface ES of the pressure side PS. The rows 174C-2/176C-2 are arranged to establish the second joint 178-2 along the external surface ES of the suction side SS. The interface members 174C, 176D are dimensioned such that the first joint 178-1 is staggered or offset from the second joint 178-2 relative to the chordwise direction X, which can increase a stiffness of the airfoil section 165 adjacent the joints 178-1, 178-2. In other examples, second joint 178-2' (shown in dashed lines in FIG. 5) is symmetrical and aligned with the first joint 178-1 with respect to the chordwise direction X.

Referring to FIG. 5, with continuing reference to FIG. 4, the sheath 174 defines a sheath cavity 174F. The tip cap 176 defines a cap cavity 176F. The sheath cavity 174F is dimensioned to receive a portion of the airfoil body 172 along the leading edge LE such that the sheath 174 extends in the spanwise direction R along both the pressure and suction sides PS, SS. The cap cavity 176F is dimensioned to receive another portion of the airfoil body 172 along the trailing edge TE such that the tip cap 176 extends in the chordwise direction X along both the pressure and suction sides PS, SS. The sheath 174 and tip cap 176 serve to encapsulate the airfoil body 172 along the leading and trailing edges LE, TE and tip portion 170, with the airfoil body 172 sandwiched between the rows 174C-1/176C-1 and rows 174C-2/176C-2 of interface members 174C, 176C, as illustrated by FIGS. 4 and 5. The sheath 174 and tip cap 176 form structural closeouts that suppress impact force induced inter-laminar stresses that may otherwise cause matrix cracking or delamination in the underlying laminate composite structure of the airfoil body 172.

Various materials can be utilized to construct the sheath 174 and tip cap 176. In the examples, the sheath 174 and/or tip cap 176 are metallic. Various metallic materials can be utilized including any of the materials disclosed herein. The sheath 174 and/or tip cap 176 can have a unitary construction, with the cavities 174F, 176F formed by a machining operation, for example. In other examples, the sheath 174 and/or tip cap 176 are made from two or more pieces mechanically attached to one another by welding or another fastening technique.

The airfoil 164 can be assembled as follows. The sheath 174 is secured to a portion of the airfoil section 165, such as along the leading edge LE, as illustrated in FIGS. 3-5. The tip cap 176 is secured to another portion of the airfoil section 165, such as along the tip portion 170 as illustrated in FIGS. 3-4. The sheath 174 and tip cap 176 are secured to the airfoil section 165 such that the first set of interface members 174C are interleaved with the second set of interface members 176C to establish one or more joints 178 along the external surface ES of the airfoil section 165. Securing the sheath 174 can include inserting a portion of the airfoil body 172 into the sheath cavity 174F, as illustrated in FIGS. 4 and 5. Securing the tip cap 176 can include inserting another portion of the airfoil section 165 into the cap cavity 176F such that the interface members 174C, 176C cooperate to bound the sheath and tip cavities 174F, 176F adjacent to the joints 178-1, 178-2, as illustrated by FIGS. 4 and 5. The sheath 174 and/or the tip cap 176 are moved in direction D2 (FIG. 6) such that the joint 178 is established between the first and second interface portions 174B, 176B, as illustrated in FIG. 4. The interface members 174C, 176C are dimensioned to establish a substantially continuous surface with at least one of the pressure and suction sides PS, SS of the airfoil section 165. Various techniques can be utilized to secure the sheath 174 and tip cap 176 to the airfoil body 172, such as fastening and bonding techniques. Various bonding materials can include epoxies and adhesives.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending between a leading edge and a trailing edge in a chordwise direction and extending between a tip portion and a root section in a spanwise direction, the airfoil section defining pressure and suction sides separated in a thickness direction;
a sheath extending in the spanwise direction along at least one of the pressure and suction sides of the airfoil section;
a tip cap extending in the chordwise direction along the at least one of the pressure and suction sides;
wherein the sheath includes a first set of interface members, the tip cap includes a second set of interface members interleaved with the first set of interface members to establish at least one joint along an external surface of the at least one of the pressure and suction sides and each interface member of the first and second sets of interface members is a protrusion including an interface body that extends from a base to a terminal end, the terminal ends of the first set of interface members are received in respective recesses between adjacent pairs of the second set of interface members; and wherein the base establishes a first width, the terminal end establishes a second width, an entrance of the recess establishes a third width, the interface body tapers inwardly from the base to the terminal end such that the second width is less than the first width, and the third width is greater than both the first and second widths such that the first and second interface members are moveable relative to each other in the chordwise direction along the tip portion such that each terminal end is insertable in the chordwise direction through the entrance of a respective one of the recesses.

2. The airfoil as recited in claim 1, wherein the sheath extends along the leading edge, and the at least one joint is dimensioned to extend along the tip portion.

3. The airfoil as recited in claim 1, wherein the airfoil section comprises a composite material.

4. The airfoil as recited in claim 1, wherein the sheath and tip cap are metallic.

5. The airfoil as recited in claim 1, wherein:
the sheath includes a sheath body extending from the tip portion along the leading edge, and the first set of interface members extend outwardly from the sheath body; and
the tip cap includes a first cap portion and a second cap portion extending transversely from the first cap portion, the first cap portion extends along the tip portion, the second set of interface members extend outwardly from the first cap portion, and the second cap portion extends in the spanwise direction along the trailing edge.

6. The airfoil as recited in claim 5, wherein:
the sheath defines a sheath cavity dimensioned to receive a portion of the airfoil section such that the sheath extends in the spanwise direction along both of the pressure and suction sides; and
the tip cap defines a cap cavity dimensioned to receive another portion of the airfoil section such that the tip cap extends in the chordwise direction along both of the pressure and suction sides.

7. The airfoil as recited in claim 6, wherein:
the sheath cavity is dimensioned to receive the leading edge of the airfoil section;
the cap cavity is dimensioned to receive the trailing edge of the airfoil section;
the at least one joint includes a first joint along the pressure side and a second joint along the suction side, the first and second joints extend along the tip portion, and the first and second sets of interface members are dimensioned such that the first and second joints are spaced apart from both the leading and trailing edges of the airfoil section; and
wherein the first set of interface members are at least partially aligned with the second set of interface members relative to the chordwise direction.

8. The airfoil as recited in claim 1, wherein the at least one joint includes a first joint along the pressure side and a second joint along the suction side.

9. The airfoil as recited in claim 8, wherein the first joint is staggered from the second joint relative to the chordwise direction.

10. The airfoil as recited in claim 1, wherein the airfoil is a fan blade.

11. A gas turbine engine comprising:
a fan section including a fan having a fan hub carrying a plurality of fan blades;
a turbine section including a fan drive turbine rotatably coupled to the fan;
a compressor section driven by the turbine section;
wherein each fan blade of the plurality of fan blades includes an airfoil section extending from a root section, a sheath extending along a leading edge of the airfoil section, wherein the airfoil section extending in a chordwise direction between the leading edge and a trailing edge, wherein the sheath includes a sheath body, and a tip cap extending along a tip portion of the airfoil section, and wherein the tip cap includes a cap body;
wherein the sheath includes a first interface portion and a first set of interface members extending outwardly from the sheath body, the tip cap includes a second interface portion and a second set of interface members extending outwardly from the cap body, wherein the first interface member is interleaved with the second interface member such that the first interface portion cooperates with the second interface portion and establishes at least one joint having a circuitous profile along an external surface of the airfoil section;
wherein each interface member of the first and second sets of interface members is a protrusion including an interface body that extends from a base to a terminal end, the terminal ends of the first set of interface members are received in respective recesses between adjacent pairs of the second set of interface members; and
wherein the base establishes a first width, the terminal end establishes a second width, an entrance of the recess establishes a third width, the interface body tapers inwardly from the base to the terminal end such that the second width is less than the first width, and the third width is greater than both the first and second widths such that the first and second interface members are moveable relative to each other in the chordwise direction along the tip portion such that each terminal end is insertable in the chordwise direction through the entrance of a respective one of the recesses.

12. The gas turbine engine of claim 11, wherein the at least one joint is dimensioned to extend along the tip portion.

13. The gas turbine engine of claim 11, wherein the airfoil section includes an airfoil body comprising a composite layup that establishes the tip portion.

14. The gas turbine engine of claim 11, wherein the sheath and the tip cap are metallic.

15. The gas turbine engine of claim 11, wherein the at least one joint includes a first joint and a second joint on opposed sides of the airfoil section.

16. The gas turbine engine of claim 15, wherein the first joint is staggered from the second joint relative to the chordwise direction.

17. A method of assembly for an airfoil comprising:
securing a sheath to a leading edge of an airfoil section, the sheath including a first set of interface members;
securing a tip cap to a tip portion of the airfoil section such that a second set of interface members of the tip cap are interleaved with the first set of interface members to establish at least one joint along an external surface of the airfoil section;

wherein each interface member of the first and second sets of interface members is a protrusion including an interface body that extends from a base to a terminal end, the terminal ends of the first set of interface members are received in respective recesses between adjacent pairs of the second set of interface members; and wherein the base establishes a first width, the terminal end establishes a second width, an entrance of the recess establishes a third width, the interface body tapers inwardly from the base to the terminal end such that the second width is less than the first width, and the third width is greater than both the first and second widths such that the first and second interface members are moveable relative to each other in the chordwise direction along the tip portion such that each terminal end is insertable in the chordwise direction through the entrance of a respective one of the recesses.

18. The method as recited in claim 17, wherein the first and second sets of interface members establish a continuous surface with at least one of a pressure side and a suction side of the airfoil section.

19. The method as recited in claim 17, wherein the sheath includes a sheath cavity, the tip cap includes a cap cavity, the step of securing the sheath includes inserting a portion of the airfoil section into the sheath cavity, and the step of securing the tip cap includes inserting another portion of the airfoil section into the cap cavity such that the first and second sets of interface members cooperate to bound the sheath and tip cavities adjacent to the at least one joint.

* * * * *